United States Patent [19]
Ralph et al.

[11] Patent Number: 5,839,692
[45] Date of Patent: Nov. 24, 1998

[54] SPLAYABLE AIRCRAFT NOSE LANDING GEAR

[75] Inventors: Harry C. Ralph, Kirkland, Wash.; Ian Robert Bennett, Cheltenham, England

[73] Assignee: The Boeing Company, Seattle, Wash.

[21] Appl. No.: 874,689

[22] Filed: Jun. 13, 1997

[51] Int. Cl.⁶ .................................................. B64C 25/12
[52] U.S. Cl. ............................. 244/102 SL; 244/102 R; 244/102 A
[58] Field of Search ......................... 244/102 SL, 102 A, 244/102 R, 102 SS

[56] References Cited

U.S. PATENT DOCUMENTS

| | | |
|---|---|---|
| 1,329,533 | 2/1920 | McCarroll . |
| 1,812,211 | 6/1931 | McCrea . |
| 2,360,759 | 10/1944 | Chalberg . |
| 2,497,004 | 2/1950 | McCabe . |
| 2,604,278 | 7/1952 | Johnson . |
| 2,826,381 | 3/1958 | Cruz . |
| 3,188,026 | 6/1965 | Perdue et al. . |
| 3,485,464 | 12/1969 | Jervan . |
| 3,768,758 | 10/1973 | Kubek . |

FOREIGN PATENT DOCUMENTS

| | | | |
|---|---|---|---|
| 978858 | 11/1950 | France | ..................................... 244/102 |
| 2747697 | 4/1979 | Germany | ........................... 244/102 R |
| 114304 | 6/1945 | Sweden | .................................. 244/102 |
| 508211 | 6/1939 | United Kingdom . | |
| 640741 | 7/1950 | United Kingdom . | |

*Primary Examiner*—Robert J. Oberleitner
*Assistant Examiner*—Tien Dinh
*Attorney, Agent, or Firm*—Christensen O'Connor Johnson & Kindness PLLC

[57] ABSTRACT

Landing gear (10) for an airplane including an elongate strut (12) having a first end and a second end longitudinally spaced therefrom. The first end of the strut being pivotally attached to the airplane for pivotal movement of the strut between an extended position for taxiing and landing of the airplane and a retracted position for stowage of the landing gear within a landing gear bay. The landing gear assembly also includes elongate first and second hub assemblies (70) and (72) each having first and second ends. Landing wheels (20) and (22) are journaled to each of the second ends of the hub assemblies. The first ends of the hub assemblies are attached to the second end of the strut for swinging movement thereof between an unsplayed position, wherein the wheels are parallel to each other, and a splayed position, wherein the first and second hub assemblies are spread to a predetermined angle from each other to permit stowage of the landing gear within the landing gear bay with minimal intrusion. The first and second hub assemblies are actuatable between the splayed and unsplayed positions by first and second foldable linkage assemblies (84) and (88) and are reversibly driven by a linear hydraulic actuator (126).

8 Claims, 10 Drawing Sheets

SPLAYABLE AIRCRAFT NOSE LANDING GEAR

FIELD OF THE INVENTION

The present invention relates to retractable landing gear, and in particular to retractable twin wheeled splayable nose landing gear assemblies.

BACKGROUND OF THE INVENTION

It is generally the practice of high speed aircraft designers to design aircraft with landing gear that is retractable into a cavity defined within some structural component of the aircraft. Some landing gear designs call for the landing gear assembly to be retractable into the fuselage, wing structure, or engine nacelles. In such designs, the landing gear assembly is swung downwardly for taxiing and landing of the aircraft and is retracted during flight by swinging the assembly upwardly into a retracted position wherein the landing gear assembly is stowed within a cavity of the aircraft. Stowing landing gear within an internal cavity of an aircraft creates unique design problems because a relatively large amount of internal space is required to accommodate the assembly and, therefore, reduces the useful space within an aircraft.

Twin wheeled nose landing gear assemblies have an especially acute stowage problem when the assembly is retracted into the nose section of an aircraft that includes an engine intake integral to the nose section, as is often seen in military aircraft. This is especially troublesome for aircraft designers because the intake already occupies a large portion of the available space within the nose section of an aircraft. Furthermore, as the size of aircraft engines increase, the space between the outer contour of an aircraft's fuselage, or outer mold line ("OML"), and the engine intake duct decreases, thus further reducing the space available to stow the landing gear assembly.

Some designs have attempted to solve the problem of limited internal storage capacity by adding a fairing to the exterior of the OML to house the landing gear assembly. However, because the aircraft OML is assumed to be aerodynamically optimized to minimize aerodynamic drag, any additional fairing in excess of the optimized OML is not desirable. Similarly, any impingement or protrusion into the engine intake duct by the gear installation cannot be tolerated because the intake is also aerodynamically optimized for peak engine performance. Thus, reducing the engine intake while maintaining the OML is also undesirable. Furthermore, the aircraft frontal area, aircraft signature, and symmetry of loading during a catapult launch may also preclude any modifications to the OML to accommodate a landing gear fairing or engine intake protrusion after the OML has been established. This is true in the design of modern day military aircraft whose OML have been designed and optimized to minimize not only an aircraft's aerodynamic drag, but also an aircraft's thermal and radar signature.

The problems associated with stowing nose landing gear within a confined space become even more acute when aircraft flotation requirements or catapult launching requirements dictate the use of a dual wheel nose landing gear configuration. The use of a single wheel landing gear would mean an increase in wheel and tire size to satisfy the flotation requirements, thus requiring an even larger cavity to stow the landing gear assembly. In the case of an aircraft capable of being launched by a catapult, a single wheel landing gear assembly would have to be off-set from the aircraft's longitudinal centerline in order to clear catapult deck equipment. This could place an undesirable roll moment on the aircraft immediately upon catapult take off because of the sudden elimination of the out of balance vertical and longitudinal ground loads associated with a catapult launch.

Thus, there exists a need for a twin wheeled landing gear assembly that may be retracted and stowed into a volume that would otherwise accommodate only a minimum sized wheel and tire without effecting aircraft structural contours that are optimized for aircraft performance. The present invention addresses these issues to overcome the limitations currently encountered by splaying the lower portions of the gear such that each single wheel and tire occupy the volume on both sides of the landing gear's longitudinal centerline.

SUMMARY OF THE INVENTION

The present invention is a twin wheeled landing gear assembly for an aircraft that may be splayed to occupy minimal volume within the aircraft. The landing gear assembly includes an elongate strut having longitudinally spaced first and second ends. The first end of the strut is pivotally attached to the aircraft for pivotal movement of the strut between an extended position, for taxiing and landing of the aircraft, and a retracted position. The landing gear assembly also includes elongate first and second hub assemblies, each having longitudinally spaced upper and lower ends. The first and second hub assemblies include a wheel assembly journaled to each of the lower ends. The upper ends of the hub assemblies are attached to the second end of the strut for swinging movement of the hub assemblies between a splayed position, where the wheel assemblies are parallel to each other, and an unsplayed position, where the first and second hub assemblies are splayed to an angle from each other. The unsplayed position permits stowage of the landing gear within the aircraft with minimal intrusion therein when the landing gear is in the retracted position.

In the preferred embodiment of the invention, the landing gear assembly includes first and second linkage assemblies attached to the second end of the strut. Each linkage assembly includes an elongate first link having a first end pinned to the second end of the strut and a second end longitudinally spaced from the first end. Each linkage assembly further includes a second link having a first end pinned to the upper end of the hub assembly and a second end pinned to the second end of the first link. An actuator is pinned between first and second ends of the first and second linkage assemblies in an opposing relationship for operatively actuating the linkage assemblies and hub assemblies between the first and second positions.

The landing gear of the present invention provides several advantages over the prior art landing gears. The use of hub assemblies that may be splayed relative to each other permits the landing gear to be stowed into a minimal volume without modifying the aerodynamically optimized structure of an aircraft, such as the fuselage or engine intake. Additionally, the present invention's use of first and second hub assemblies attached to a single strut instead of two separate struts, not only saves weight, but also reduces maintenance. Furthermore, the use of first and second links, and an actuator in accordance with the present invention, also provides a simple and effective method of splaying the wheels for stowage and locking the wheels into a parallel position when the landing gear is in the extended position for taxiing and landing. These advantages combine to allow the stowage of a multiple wheel landing gear assembly into a minimal volume without changing aerodynamically optimized structural geometry, while providing a landing gear assembly that is lighter in weight and requires less maintenance than the prior art.

BRIEF DESCRIPTION OF THE DRAWINGS

The foregoing aspects and many of the attendant advantages of this invention will become better understood by reference to the following detailed description, taken in conjunction with the accompanying drawings, wherein.

DETAILED DESCRIPTION OF THE PREFERRED EMBODIMENT

Figure 1:
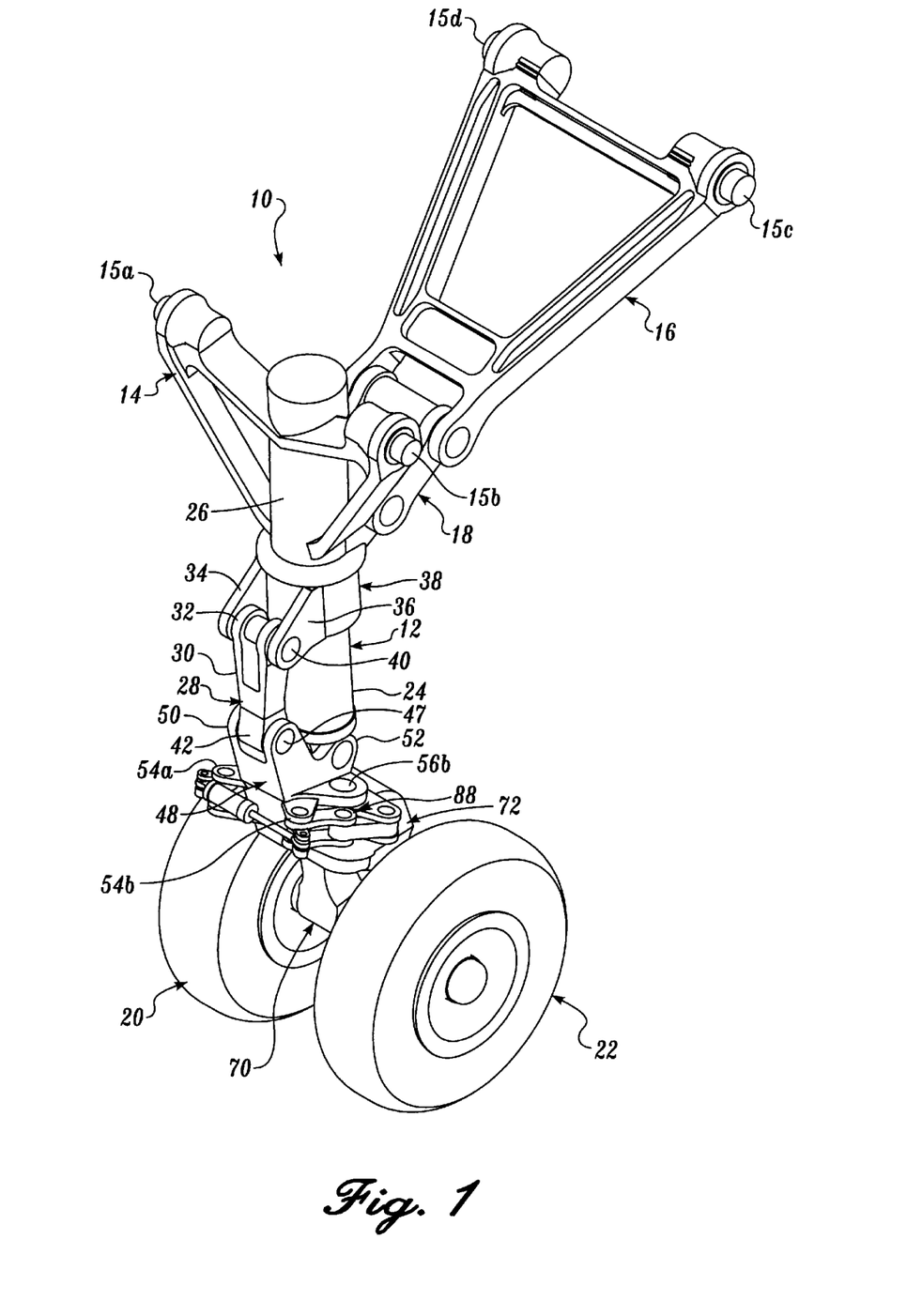
FIG. 1 is a perspective view of a twin wheeled nose landing gear of the present invention.

A splayable twin wheel nose landing gear assembly 10 for an airplane, as seen in FIG. 1, is shown extending downwardly from the fuselage (not shown) of an airplane as it would be deployed for landing and taxiing of the airplane. The landing gear assembly 10 includes an elongate shock strut 12, a main fitting brace 14, and a drag brace 16 for swinging attachment to the airplane.

The main fitting brace 14 is configured as an inverted triangle with the apex of the triangle rigidly attached near the midsection of the strut 12, in a manner well known in the art. The base of the main fitting brace 14 is rigidly attached to the upper end of the strut 12 such that the main fitting brace 14 defines the major load paths into the fuselage of the airplane, thereby reacting the ground loads applied to the landing gear 10.

The drag brace 16 is an elongate "H" shaped member having a bifurcated lower end transversely mounted to the rearward side of the strut 12, near the midsection of the strut 12, by an elongate lock link 18. A first end of the lock link 18 is pinned to the lower end of the drag brace 16. An opposing second end of the link 18 is similarly pinned to first and second rearwardly and upwardly extending flanges (not shown) formed at the midsection of the strut 12, thereby defining an assembly that is foldable when the landing gear 10 is retracted and stowed into the landing gear bay (not shown), as is well known in the art. The upper ends of the main fitting brace 14 and the drag brace 16 define a plurality of attachment points 15a, 15b, 15c, and 15d that are swingably mounted within the fuselage such that the landing gear 10 may be folded and retracted into the landing gear bay.

Figure 2:
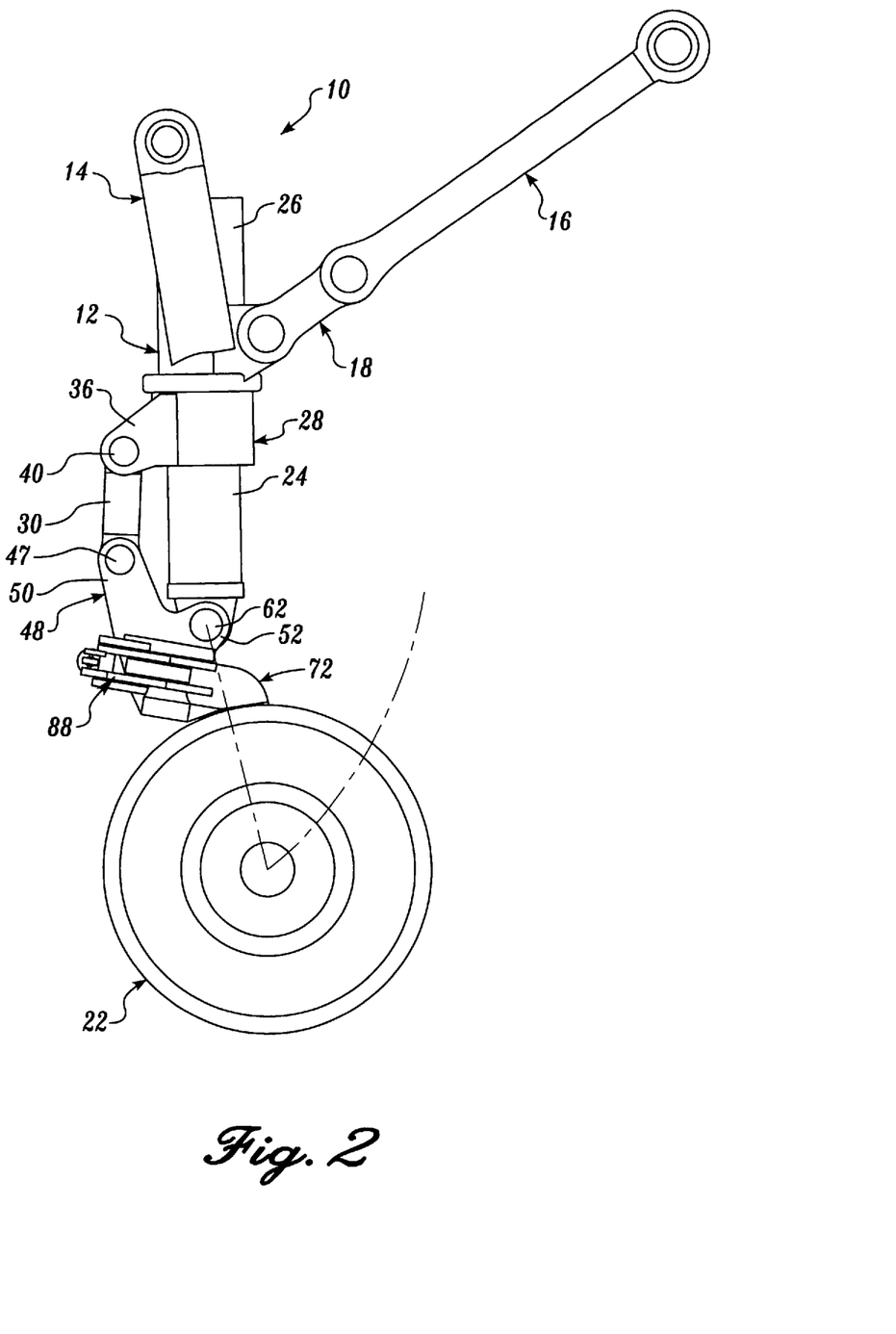
FIG. 2 is a side view of a twin wheeled nose landing gear of the present invention shown in the extended position.
Figure 3:
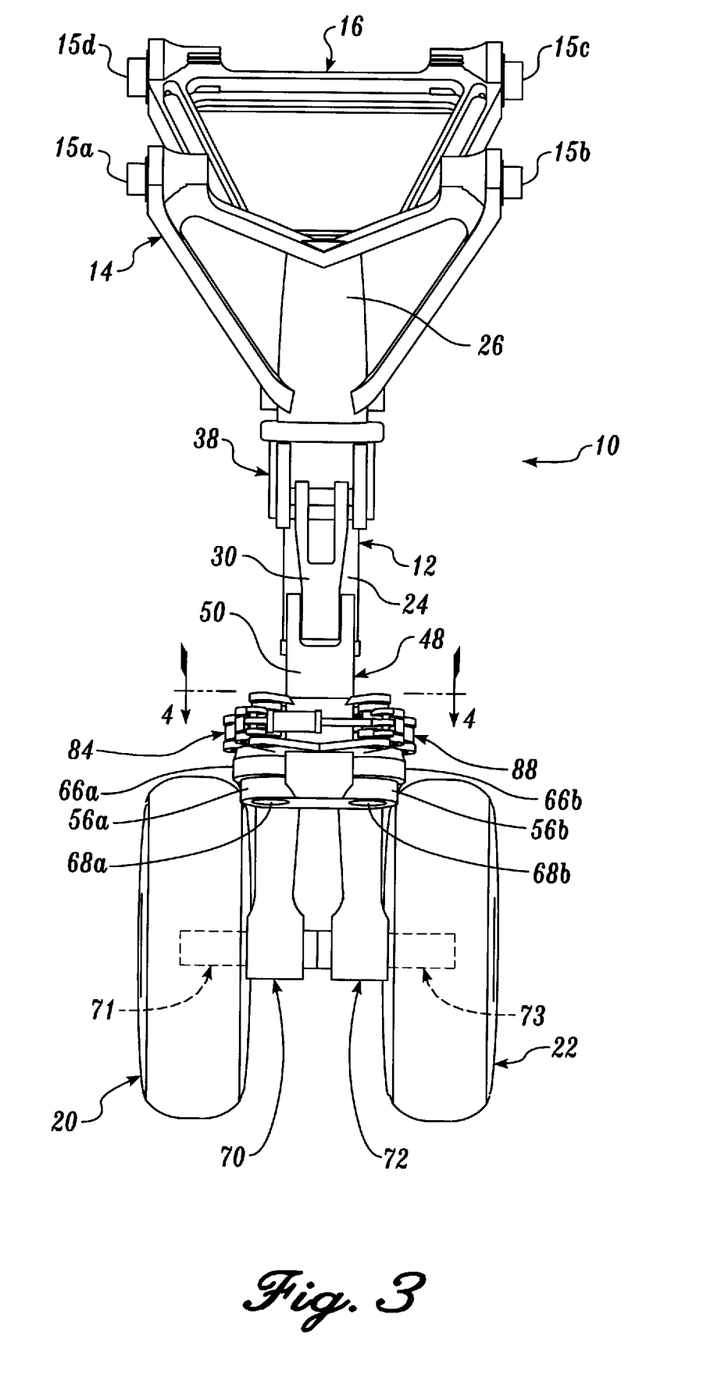
FIG. 3 is a frontal view of the landing gear of the present invention shown in the extended position.

Referring to FIGS. 1, 2, and 3 the landing gear 10 also includes first and second hub assemblies, configured as first and second trailing lever arms 70 and 72. Each lever arm 70 and 72 has an upper end pinned to a lever hub 48. First and second wheels 20 and 22 are journaled to the lower ends of the lever arms 70 and 72, and are described in greater detail below. Although the preferred embodiment of the present invention illustrates a single wheel journaled to each lever arm, more wheels journaled to each lever arm are also within the scope of the invention. The lever arms 70 and 72 are selectively swingable between a first position wherein the wheels 20 and 22 are parallel to each other, and a second position, wherein the wheels are splayed outwardly from the lever hub 48 by first and second linkage assemblies 84 and 88, to be described in greater detail below.

Referring to FIG. 2, together with FIG. 1, the strut 12 includes telescoping inner and outer shock strut cylinders 24 and 26, respectively. The inner shock strut cylinder 24 is axially slidable within the outer cylinder 26 and protrudes from the lower end thereof. A shock absorber mechanism (not shown), such as an encapsulated shock absorber or oleo, is included inside the telescoping inner and outer cylinders 24 and 26 to react ground loads encountered during landing and taxiing the aircraft.

The lower end of the inner cylinder 24 is pivotally attached to the lever hub 48, as is described in greater detail below. The lever hub 48 is substantially rectangular in shape and includes a plurality of integrally formed yokes that project outwardly therefrom. In the preferred embodiment, a first hub yoke 50 projects upwardly from the forward section of the upper surface of the lever hub 48. A second hub yoke 52, also integrally formed from the upper surface of the lever hub 48, projects upwardly towards the rear of the lever hub 48. Third and fourth hub yokes 54 and 56 are integrally formed on first and second sides of the lever hub 48. The third hub yoke 54 is defined in the forward section of the lever hub 48 and projects forwardly and outwardly therefrom at a predetermined angle. The fourth hub yoke 56 is positioned rearward of the third hub yoke 54 on both sides of the lever hub 48 and projects transversely outwardly from the side surface of the lever hub 48 at a substantially right angle thereto. The hub yokes 50, 52, 54, and 56 are bifurcated and have coaxially aligned bores (not shown) that extend through the bifurcated portions of each yoke to define multiple attachment joints described in more detail below.

The lever hub 48 is symmetrical about a centerline defined through the elongate direction of the lever hub 48. Therefore, the third and fourth hub yokes 54 and 56 are identically configured and formed, as described above, on both sides of the lever hub 48. Thus, a first set of third and fourth hub yokes 54a and 56a are integrally formed on the first side of the lever hub 48, while a second set of third and fourth hub yokes 54b and 56b are formed in mirror image on the second side thereof.

Rotation of the inner cylinder 24 with respect to the outer cylinder 26 is prevented by a torsion link assembly 28 that is mounted parallel to the elongate direction of the strut 12 on the forward facing portion of the strut 12, as seen in FIG. 1. The torsion link assembly 28 is hingedly mounted between an annular strut collar 38, mounted substantially near the midsection of the strut 12, and the lever hub 48. The torsion link assembly 28 includes an elongate torsion link 30 having a bifurcated first end 32 pinned between first and second forward protruding flanges 34 and 36 of the strut collar 38 by a transversely oriented pin 40 that extends through the thickness of the flanges 34 and 36 and the first end 32. (Pin 40 is oriented perpendicularly to the surface of the drawing in the side view of FIG. 2.) The torsion link 30 includes a second end 42, longitudinally spaced from the first end 32, pinned within the bifurcated portion of the first hub yoke 50 by a transversely oriented pin 47 extending through the thickness thereof. As configured, the torsion link 30 prevents the rotation of the inner cylinder 24 with respect to the outer cylinder 26 without restricting axial motion of the inner cylinder 24 within the outer cylinder 26. Furthermore, the torsion link 30 is swingably attached to pin 40. Thus, as the wheels are compressed as described below, the torsion link 30 allows smooth sliding of the inner cylinder 24 within the outer cylinder 26.

As seen in FIG. 2, the lower end of the inner cylinder 24 of the strut 12 is inserted between the bifurcated portion of the second hub yoke 52 of the lever hub 48 and is swingably attached thereto by a transversely oriented pin 62. The pin joints defined by the parallel pins 40, 47 and 62 permit the landing wheels 20 and 22 to rotate about a center of rotation defined by the pin 47 when the airplane has landed and weight has been applied to the wheels 20 and 22. The lever hub 48 then moves in compound motion with the pin 62 sliding upwardly along the elongate direction of the inner cylinder 24 and the pin 47 rocking in an arcuate path about the pin 40. Thus, the wheels 20 and 22 rotate in a counter-clockwise direction (in side view) about the pin 47 to define a semi-articulated landing gear when weight is applied to the wheels 20 and 22.

Now referring to FIG. 3, the landing wheels 20 and 22 are attached to the lower end of the lever hub 48 by first and second trailing lever arms 70 and 72 on first and second axles 71 and 73 (shown in phantom), in a manner well known in the art. The lever arms 70 and 72 are configured as inverted "L" shaped arms. Each arm 70 and 72 has an upper end 66a and 66b, respectively, defined by terminal end of the dogleg portion near the arcuate portion thereof. The upper end 66a of the first lever arm 70 is sandwiched and pinned between the bifurcated portion of the fourth hub yoke 56a formed in the first side of the lever hub 48 to define a first lever arm pin 68a. Similarly, the upper end 66b of the second lever arm 72 is sandwiched and pinned between the bifurcated portion of the fourth hub yoke 56b of the second lever arm 72 formed on the second side of the lever hub 48 to define a second lever arm pin 68b, oriented similarly to pin 68a. As configured, the first and second lever arm pins 68a and 68b are oriented in a generally upright position to permit outward and sideward swinging movement of the lever arms 70 and 72 relative to the axis of the strut 12.

Figure 4:
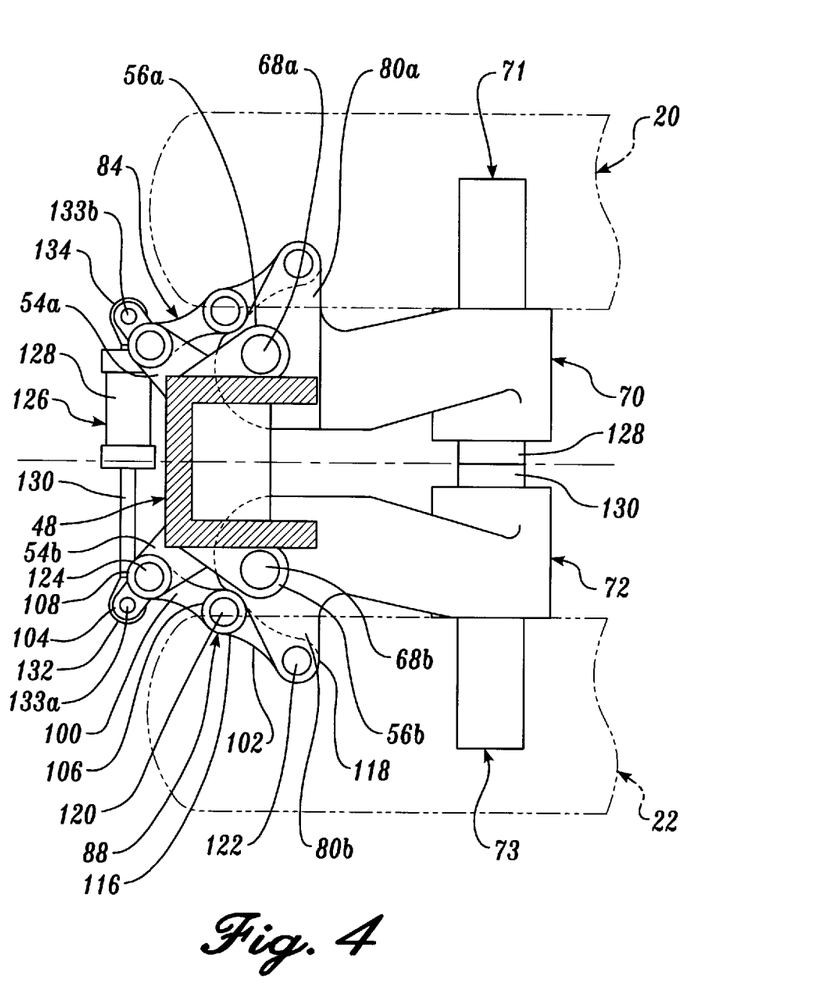
FIG. 4 is a cross-sectional top view of the landing gear of the present invention taken along Section 4—4 of FIG. 3.

As may be seen better in FIG. 4, the first and second lever arms 70 and 72 each include outwardly projecting side yokes 80a and 80b, respectively, that are integrally formed on the upper ends 66a and 66b, near the arcuate end thereof. Pinned between the bifurcated portion of the side yoke 80a of the first lever arm 70 and the third hub yoke 54a is a first linkage assembly 84 for actuating the swinging movement of the lever arm 70, to be described in detail below. A second linkage assembly 88 is pinned between the bifurcated portion of the side yoke 80b of the second trailing lever arm 72 and the third hub yoke 54b defined in left side of the lever hub 48, as previously described for the first linkage assembly 84. All of the pins for these linkage assemblies are oriented substantially parallel to the pins 68a and 68b. The preferred embodiment of the present invention includes both first and second linkage assemblies 84 and 88 that are identically configured and, therefore, will be described herein by reference to the second linkage assembly 88.

Figure 5:
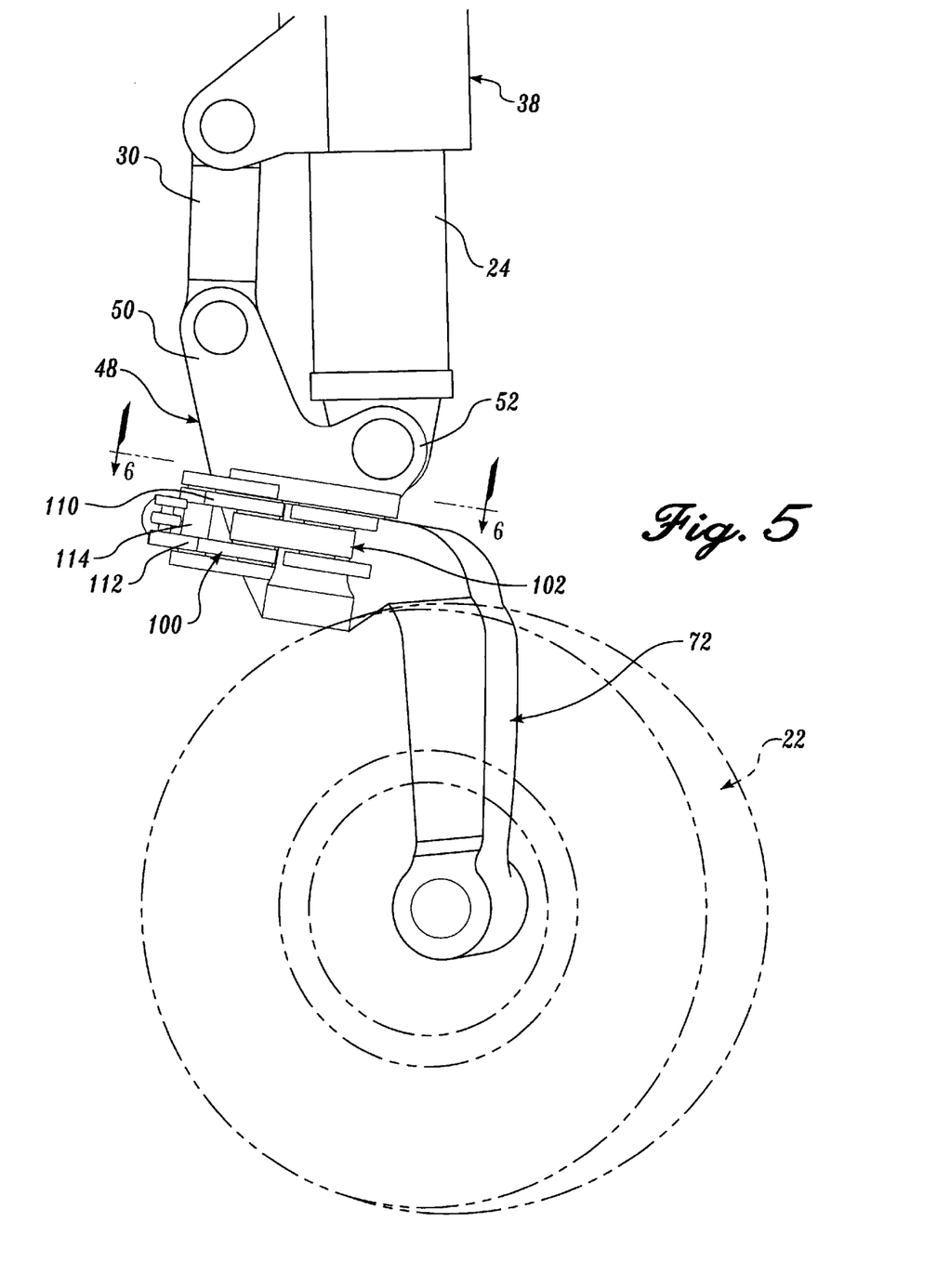
FIG. 5 is a side view of the landing gear of the present invention shown in the partially splayed position with the tire shown in hidden lines.

Still referring to FIG. 4, the linkage assembly 88 includes elongate first and second links 100 and 102, respectively. The first link 100 is "L" shaped in configuration and defines first and second holes (not shown) in longitudinally spaced first and second ends 104 and 106 thereof. A third hole (not shown) is also defined in an arcuate end 108 of the link 100. As may be better seen in FIG. 5, the first link 100 includes an upper portion 110 and a lower portion 112 that are held in spaced disposition at the actuate end 108 by a cylindrical spacer 114. The spacer 114 includes a vertically extending bore therethrough (not shown). The upper and lower portions 110 and 112 are identically configured such that all of the bores described above coaxially align when the spacer 114 is sandwiched between the arcuate ends 108 of the upper and lower portions 110 and 112.

Referring back to FIG. 4, the second link 102 is suitably manufactured from a solid piece of high strength metal, such as steel or titanium. Longitudinally spaced ends 116 and 118 of the second link 102 include first and second bores (not shown) extending through the thickness thereof. The second link 102 is swingably attached to the first link 100 by sandwiching the first end 116 of the second link 102 between the upper and lower portions 110 and 112 of the first link 100. A pin (not shown) is then fastened vertically therethrough to define a center pin joint 120 between the first and second links 100 and 102 for swinging movement of the links 100 and 102 about an axis that is normal to the elongate direction of the links. Therefore, the linkage assembly 88, configured as described above, is an elongate "L" shaped member having first and second links 100 and 102 longitudinally connected by a center pin joint 120 for swinging movement thereof.

Still referring to FIG. 4, the previously described linkage assembly 88 is pinned between the lever arm 72 and the lever hub 48 for swinging movement of the lever arm. The first end of the linkage assembly 88, defined by the second end 118 of the second link 102, is pinned between the bifurcated portion of the side yoke 80 of the lever arm 72, thereby defining a first end pin joint 122. The arcuate end 108 of the first link 100 is similarly pinned between the bifurcated portion of the third hub yoke 54b to define an arcuate end pin joint 124 of the linkage assembly 88. Thus, the linkage assembly 88 is pinned diagonally between the lever hub 48 and the lever arm 72 to actuate the swinging movement of the arm 72.

The first linkage assembly 84 is similarly configured and pinned on the opposing side of the lever hub 48, between the lever hub 48 and the lever arm 70, as described above for the second linkage assembly 88.

The second ends of each linkage assembly 84 and 88, defined by the first ends 104 of the first links 100, include a linear hydraulic actuator 126 that is opposingly and transversely pinned therebetween. The actuator 126 includes an outer cylinder 128 and a rod 130 longitudinally disposed therein. The rod 130 is axially slidable within the outer cylinder 128 and protrudes from the lower end thereof. The end of the rod 130 that protrudes from the outer cylinder 128 terminates in a flattened flange 132. The flange 132 has a bore (not shown) extending through the thickness thereof and coaxially aligns with the bores of the first end 104 of the first link 100 when the flattened flange 132 is inserted therebetween. A pin is then inserted into the coaxially aligned bores to define a second end pin joint 133a. The end of the outer cylinder 128, opposing the rod 130, similarly includes a flattened flange 134 having a bore (not shown) extending therethrough for pivotal attachment to the first linkage assembly 84. The flange 134 of the outer cylinder 128 is inserted and pinned between the bifurcated first end 104 of the first linkage assembly 84, thereby defining a second end pin joint 133b for the first linkage assembly 84. As thusly configured, the actuator 126 is operable to selectively actuate the first and second linkage assemblies 84 and 88, and thus, the first and second trailing lever arms 70 and 72 between an unsplayed position, in which the landing wheels 20 and 22 are disposed parallel to each other, and a splayed position, wherein the wheels 20 and 22 are splayed to a predetermined angle relative to each other, as more fully explained below.

Operationally, the reversible actuation of the landing gear 10 between splayed and unsplayed positions is accomplished by the interaction of the actuator 126 and the first and second linkage assemblies 84 and 88. When the landing gear 10 is in the fully extended position for landing and taxiing the airplane, as seen in FIGS. 1–4, the wheels 20 and 22 are locked into the unsplayed position by the linkage assemblies 84 and 88. The wheels 20 and 22 are precluded from overextending into a "toe-in" condition, where the forward facing surface, or toe, of the wheels 20 and 22 overrotate about the elongate direction of the strut 12, by the center pin joints 120 of the linkage assemblies 84 and 88 extending into an over center lock position in a manner that is well known in the art. As a fail-safe mechanism to preclude the wheels from "toeing in" in the event the linkage assemblies 84 and 88 should fail, first and second bosses 136 and 138 are mounted on the inward facing surfaces of the lower ends of the first and second trailing lever arms 70 and 72. The bosses 136 and 138 are suitably manufactured from high strength material, such as a stainless steel or aluminum, and are of predetermined dimensions such that they will abut against each other if the wheels 20 and 22 exceed a predetermined angle while in the unsplayed position.

Figure 6:
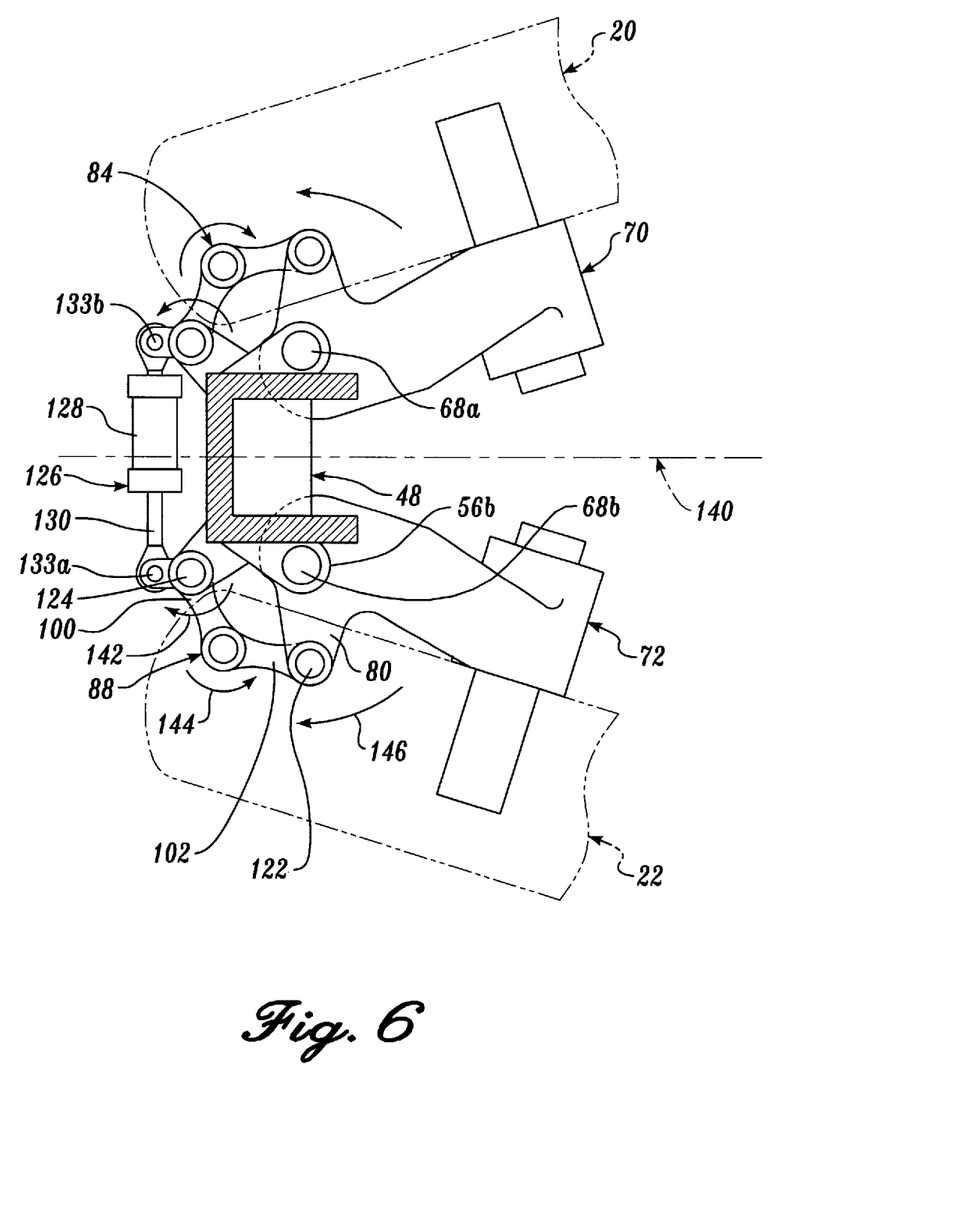
FIG. 6 is a cross-sectional top view of the landing gear shown in the partially splayed position and the tires shown in hidden lines taken along Section 6—6 of FIG. 5.
Figure 7:
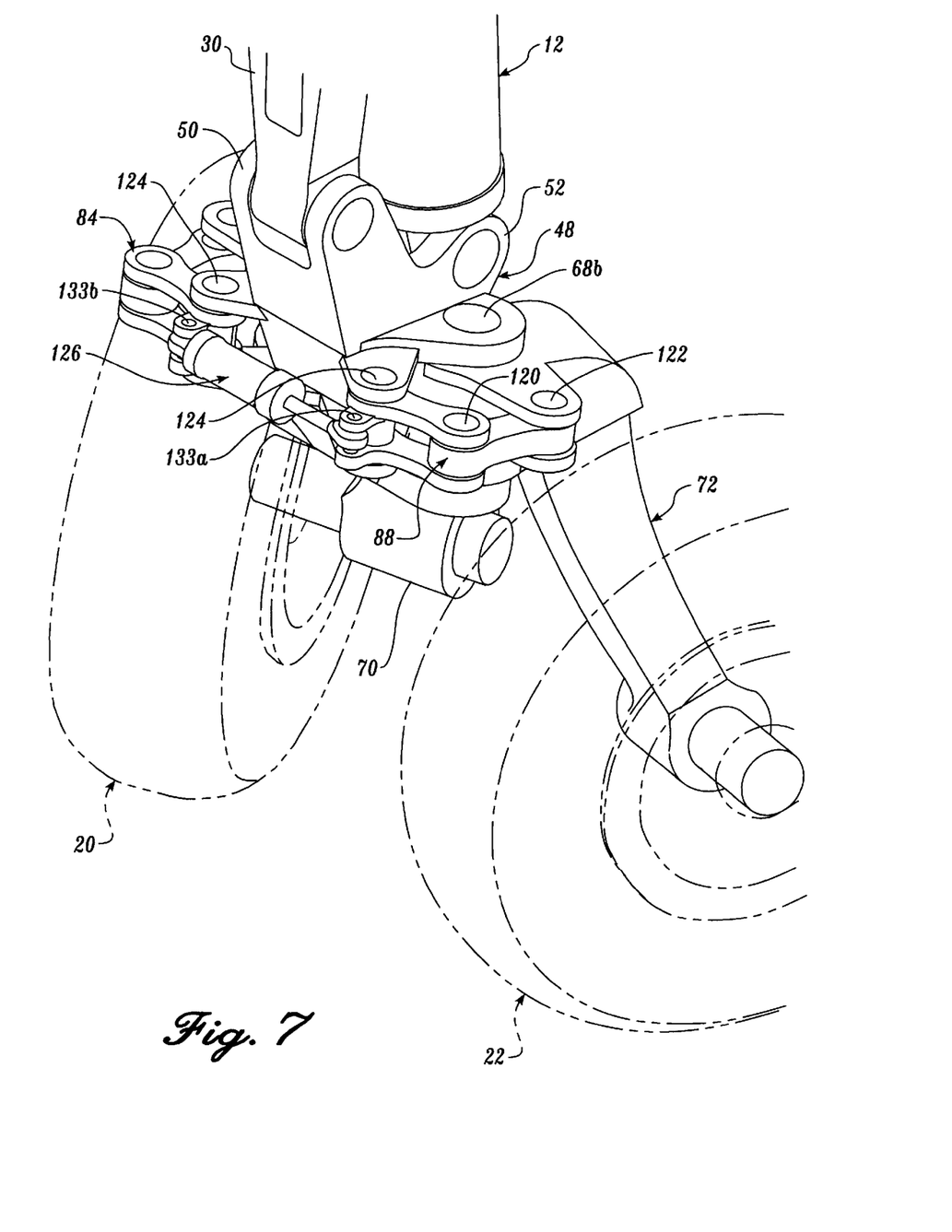
FIG. 7 is a perspective view of the landing gear of the present invention shown in the partially splayed position with the tires shown in hidden lines.

The landing gear 10 is actuatable into the splayed position as follows and may be better understood by referring to FIGS. 6–10. The reversible actuator 126 is connected to an actuation means (not shown), wherein after a predetermined amount of time after the airplane has become airborne, the pilot may operatively signal the actuator 126 via the actuation means to withdraw the rod 130 within the outer cylinder 128. As previously described, the free end of the rod 130 is pivotally mounted to the linkage assembly 88 to define a second end pin joint 133a. Referring to FIGS. 6 and 7, as the rod 130 is withdrawn into the outer cylinder 128, the second end pin joint 133a, being integrally formed to the linkage assembly 88, causes the first link 100 to rotate about the arcuate joint 124 in a clockwise direction, as indicated by the arrow 142. As the first link 100 rotates, it pulls the second link 102 along an arcuate path, thereby causing the second link 102 to rotate in a counterclockwise direction about the center pin joint 120, as indicated by the arrow 144. As the second link 102 rotates about the center pin joint 120, it also travels along an arcuate path away from the lever hub 48, thereby causing the second trailing lever arm 72 to rotate in a clockwise direction about the second lever arm pin joint 68b, as indicated by the arrow 146. The operation of the first linkage assembly 84 mirrors the description of the second linkage assembly 88 and, therefore, will not be described. Thus, the contraction of the actuator 126, having the ends thereof opposingly and operatively pinned between the first and second linkage assemblies 84 and 88, causes the links 100 and 102 of the linkage assemblies 84 and 88 to fold in on each other, thereby causing the landing wheels 20 and 22 to react into a partially splayed position as seen in FIGS. 6 and 7.

Figure 8:
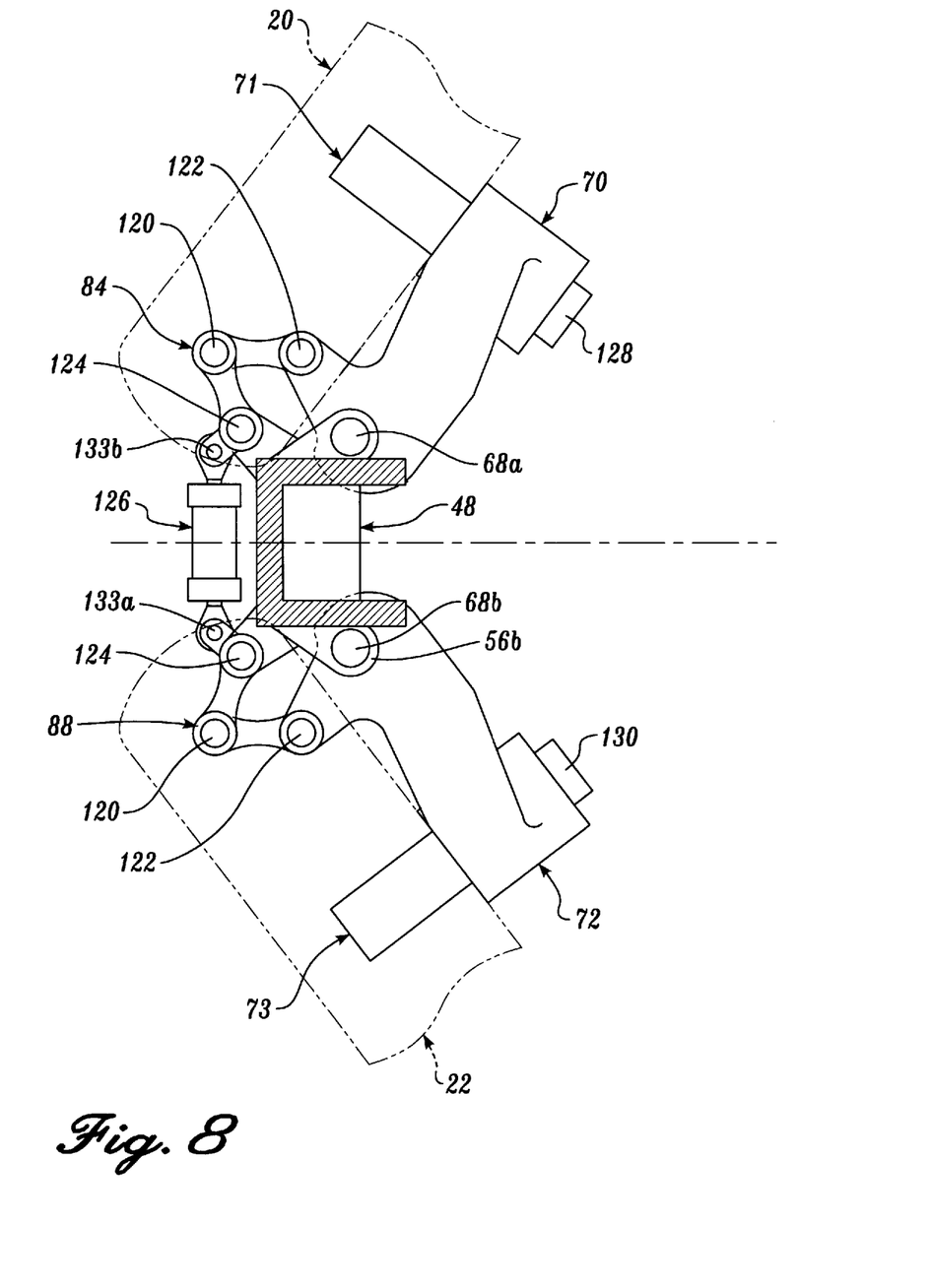
FIG. 8 is a cross-sectional top view of the landing gear shown in the fully splayed position taken along Section 6—6 of FIG. 5.
Figure 9:
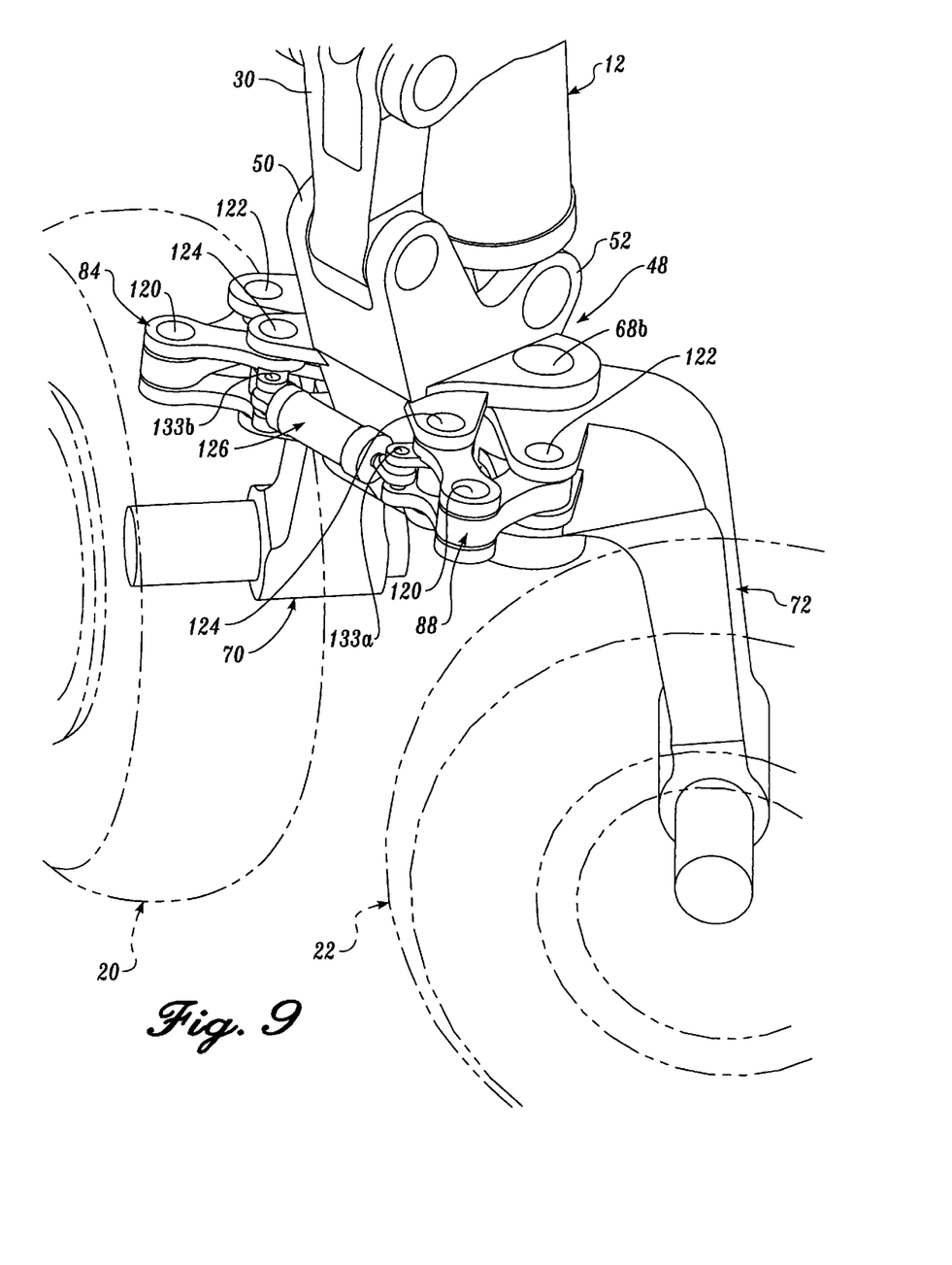
FIG. 9 is a perspective view of the landing gear of the present invention shown in the fully splayed position with the tires shown in hidden lines.
Figure 10:
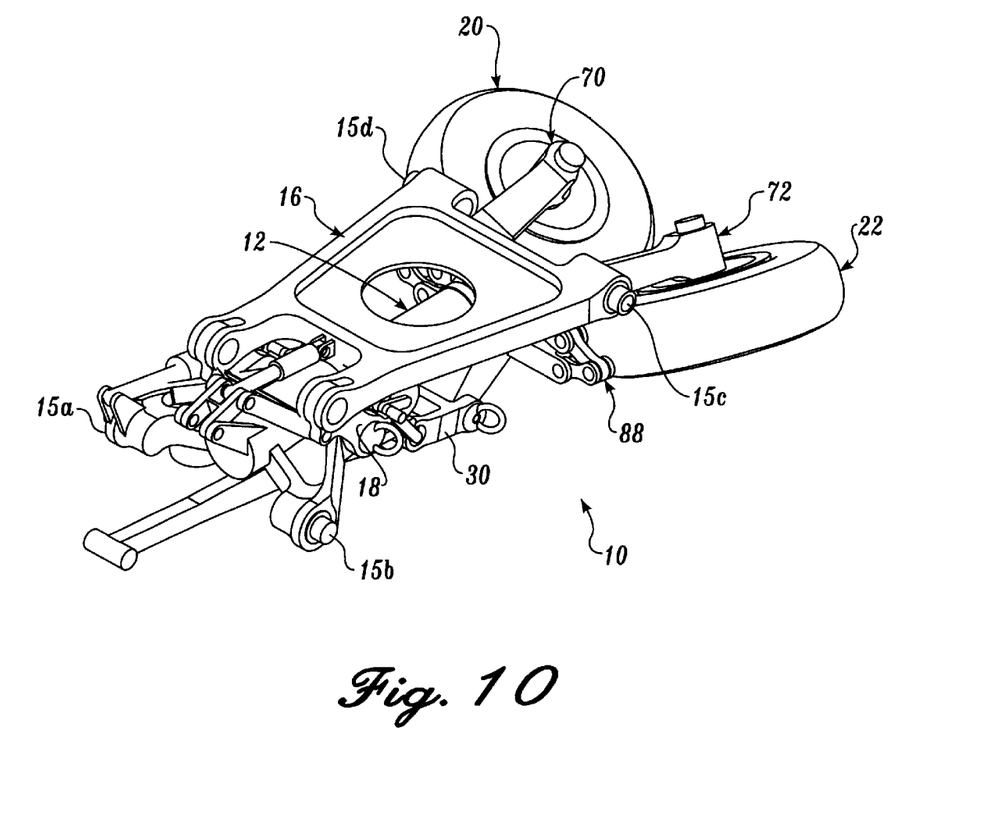
FIG. 10 is a perspective view of the landing gear of the present invention shown in the fully splayed and retracted position.

FIGS. 8 and 9 illustrate the landing gear 10 in the extended and fully splayed position. In the fully splayed position, the rod 130 of the actuator 126 is fully retracted within the outer cylinder 128. Thus, the linkage assemblies 84 and 88 are internally locked into position by the actuator 126. As seen in FIG. 10, it will be appreciated that the landing gear 10, with the landing wheels 20 and 22 in the fully splayed position, may be retracted, by means well known in the art, and stowed into a minimally sized landing gear bay (not shown).

The landing gear 10 may be reversibly actuated from the splayed to the unsplayed position by reversing the actuator 126 and the steps described above to actuate the landing gear 10 into the splayed position.

Although the preferred embodiment of the present invention uses an actuator to splay the wheels as described above, other means of actuation, such as rotary hydraulic motors or jack screws are within the scope of the present invention. Furthermore, the utilization of one actuator per wheel to actuate each between the splayed and unsplayed positions is also within the scope of the present invention. In addition, a spring or solenoid actuated device may be used in lieu of the actuator to drive the wheels between the splayed and unsplayed positions. Further, a spring or solenoid actuated device may be used as a fail-safe backup mechanism in the event that the actuator should fail.

The previously described version of the present invention has the advantage of stowing landing gear into a minimal volume without modifying the aerodynamically optimized structure of an aircraft. Additionally, the present invention's use of first and second trailing lever arms 70 and 72 attached to a single strut 12 instead of two or more separate struts not only saves weight, but also reduces maintenance. Thus, the present invention allows the stowage of a multiple wheel landing gear assembly into a minimal volume without changing aerodynamically optimize structural geometry, while providing a landing gear assembly that is lighter in weight and requires less maintenance than the prior art.

From the foregoing description, it can be seen that the landing gear of the present invention incorporates many novel features and offers significant advantages over the prior art. It will be apparent to those of ordinary skill that the embodiment of the invention illustrated and described herein is exemplary only. Changes can be made to the foregoing embodiment while remaining within the spirit and scope of the present invention. For example, a plurality of wheels may be journaled to each of the trailing lever arms. Further, the principles of the present invention may be applied to main landing gear assemblies as well. Thus, the illustrated and described embodiment is to be considered as exemplary only and the invention itself should be evaluated only as defined in the claims which follow.

The embodiments of the invention in which an exclusive property or privilege is claimed are defined as follows:

1. A landing gear assembly for an airplane, comprising:
   an elongate strut having a first end and a second end longitudinally spaced therefrom, said first end being attached to said airplane for swinging movement of said strut between an extended position for taxiing and landing of said airplane and a retracted position;
   elongate first and second hub assemblies each having first and second ends, at least one wheel journaled to each of said second ends, said first ends of said hub assemblies being attached to said second end of said strut for outward and sideward swinging movement thereof between a first position wherein said wheels are parallel to each other and a second position wherein said first and second hub assemblies are splayed to an angle from each other to permit stowage of said landing gear within said airplane with minimal intrusion when said landing gear is in said retracted position; and splaying means pivotally attached between said second end of said strut and said first ends of said first and second hub assemblies for selectively locking and pivoting said hub assemblies between and into said first and second positions.

2. The landing gear assembly of claim 1 further comprising, a lever hub having upper and lower ends spaced by opposing first and second side surfaces and first and second end surfaces to said upper end of said lever hub attached to said second end of said strut, said first end of said first and second hub assemblies pivotally attached to said first and second side surfaces of said lower end of said lever hub.

3. The landing gear assembly of claim 2, wherein said splaying means comprises first and second foldable linkage assemblies, wherein said first and second linkage assemblies each comprise a first end pinned to said lower end of said lever hub and a second end pinned to said first end of said hub assembly.

4. The landing gear assembly of claim 3, wherein said first and second linkage assemblies each comprise elongate first and second links, said first link having a first end pinned to said lower end of said lever hub and a second end, said second link having a first end pinned to said first end of said hub assembly and a second end pinned to said second end of said first link.

5. The landing gear assembly of claim 3, wherein said splaying means comprises an actuator having longitudinally spaced first and second ends pinned between said first ends of said first and second linkage assemblies in an opposing relationship for operatively actuating said linkage assemblies and said hub assemblies between said first and second positions.

6. The landing gear assembly of claim 5, wherein said actuator pinned between said first ends of said first and second linkage assemblies for operatively actuating said first and second links into an over center locked position when said landing gear is in said extended position.

7. A landing gear assembly for an airplane, comprising:

an elongate shock strut having first and second ends, said first end pivotally attached to said airplane for pivotal movement of said shock strut between an extended position for taxiing and landing of said airplane and a retracted position;

a lever hub having a first end pinned to said second end of shock strut and a second end;

elongate first and second hub assemblies each having upper and lower ends and at least one wheel journaled to said lower end, said upper end of said hub assemblies pivotally attached to said second end of said lever hub for pivotal movement of said first and second hub assemblies;

first and second foldable linkage assemblies, wherein each linkage assembly comprises:
(a) an elongate first link having a first end pinned to said second end of said lever hub and a second end;
(b) an elongate second link having a first end pinned to said upper end of said hub assembly and a second end pinned to said second end of said first link; and an actuator pinned between said first end of said first links of said first and second linkage assemblies for selectively actuating said linkage assemblies and said hub assemblies between a first position wherein said wheels are parallel to each other and a second position wherein said hub assemblies and said wheels are splayed to an angle from said elongate direction of said shock strut to permit stowage of said wheels within said airplane with minimal intrusion when said landing gear is in said retracted position.

8. A nose landing gear assembly for an airplane having a forward nose section and an engine inlet located in said nose section to define first and second cavities on opposing sides of said inlet, said nose landing gear further comprises:

an elongate shock strut having first and second ends, said first end pivotally attached to said airplane for pivotal movement of said shock strut between an extended position for taxiing and landing of said airplane and a retracted position;

a lever hub mounted on said second end of shock strut;

elongate first and second hub assemblies each having upper and lower ends and at least one wheel journaled to said lower end, said upper end of said hub assemblies pivotally attached to said lever hub for pivotal movement of said first and second hub assemblies;

first and second foldable linkage assemblies, wherein each linkage assembly comprises:
(a) an elongate first link having an arcuate portion pinned to said lever hub, said first link having a first end and a second end;
(b) an elongate second link having a first end pinned to said upper end of said hub assembly and a second end pinned to said second end of said first link; and an actuator pinned between said first end of said first link of said first and second linkage assemblies for selectively actuating said linkage assemblies and said hub assemblies between a first position wherein said wheels are parallel to each other and a second position wherein said hub assemblies and said wheels are splayed to an angle from said elongate direction of said shock strut to permit stowage of said wheels within said first and second cavities when said landing gear is in said retracted position.

* * * * *